Feb. 26, 1963  R. H. BROWN  3,078,714
MILK FLOW MEASURING DEVICE
Filed Sept. 25, 1959
Fig. 1.
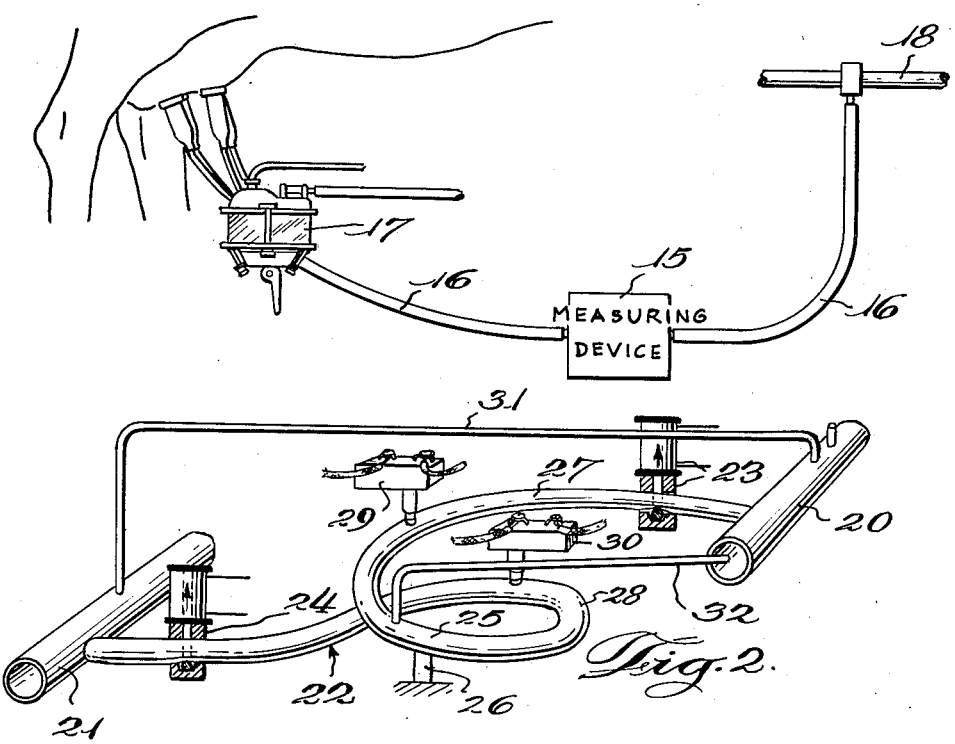
Fig. 2.
Fig. 3.
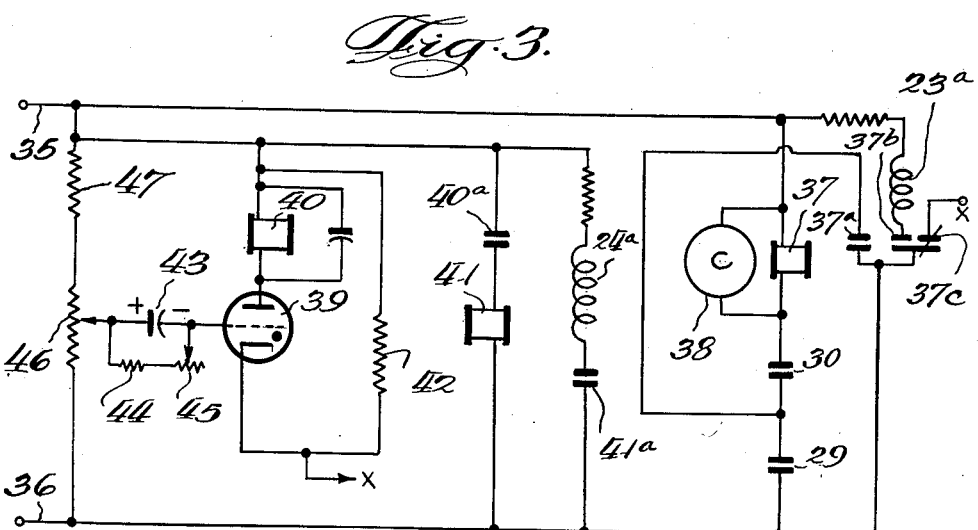
Inventor
Robert H. Brown
By Hofgren, Brady, Wegner, Allen & Stellman
Attorneys United States Patent Office 3,078,714
Patented Feb. 26, 1963

3,078,714
MILK FLOW MEASURING DEVICE
Robert H. Brown, Athens, Ga., assignor to Babson Bros. Co., a corporation of Illinois
Filed Sept. 25, 1959, Ser. No. 842,501
7 Claims. (Cl. 73—223)

This invention relates to flow measuring devices and more particularly to such devices for use with a milking system.

An efficient dairy farm operation requires that accurate records be kept of the production of milk of the various individual cows so that those cows which are not producing a sufficient quantity of milk may be culled from the herd and those which are producing exceptional amounts may be selectively bred and specially fed. With bucket milkers the necessary data can be obtained by weighing each milker bucket as it is removed from the animal and recording the weight. Carry-away milk pipe-lines, which are becoming more and more popular, require a different type of weighing system. Weigh jars into which all of the milk from an animal flows before it passes into the pipeline have been used for many years. However, the process of obtaining weight information in this manner requires special manipulation of the weigh jar or container and the weigh container must in most cases be disassembled and hand washed following use.

The flow of milk from a single animal, and records must be kept by individual animals, has an average rate of the order of seven to ten pounds per minute, but may be intermittent and generally is at a lower rate (down to one-half pound per minute) as the cow milks out. The density of the milk varies from cow to cow and with one cow at different times of the year depending primarily on the amount of air in the milk and on its butterfat content. As a record of the weight of milk produced is desired, a measurement of volume is generally unsatisfactory. Flow measuring devices presently available on the market are not suitable for measuring either the weight or volume of milk in a carry-away milk handling system. A principal object of this invention is the provision of new and improved measuring devices for carry-away milk handling systems.

One feature of the invention is the provision in an evacuated carry-away milking system of means for dividing the milk flowing therethrough into equal portions and means responsive to the dividing means for indicating the quantity of milk flowing through the system. Preferably the equal portions of milk are based on weight, and the indicating means provides a direct weight indication.

Another feature of the invention is the provision of a measuring system including a flexible hose having a valved inlet connected with a source of milk and a valved outlet connected with a carry-away milk line, together with means responsive to the weight of milk in the hose for actuating the valves dividing the milk flowing therethrough into equal portions by weight. A further feature is that the center of the flexible hose is fixed in position separating the milk measuring section of the hose into upper and lower portions having switch means associated with each for effecting the control of the inlet and outlet valves. Yet another feature is that the air pressure or vacuum level in the milk source, carry-away pipeline and measuring hose are equalized.

Further features and advantages of the invention will readily be apparent from the following specification and from the drawings, in which:

FIGURE 1 is a fragmentary diagrammatic illustration of a portion of a system embodying the invention;

FIGURE 2 is a diagrammatic illustration of one form of measuring device, based on the weight of milk flowing through the system; and FIGURE 3 is a schematic diagram of the control circuit for the device of FIGURE 2.

In FIGURE 1 a measuring device 15 is illustrated as connected in the hose or milk line 16 between milker 17, which may be of the type illustrated in Thomas Patent 2,783,737, and an evacuated carry-away milk pipe line 18. In order to obtain individual records for each animal milked, there must be one measuring device 15 for each milker in use. Measuring device 15 must accurately indicate or record the quantity of milk produced regardless of the rate of flow through hose 16 or density variations in the milk, which may vary rather widely with the amount of trapped air and with variations in milk fat content. Measuring device 15 must not affect the vacuum level in the milker 17 and further should be easy to clean, preferably by circulation of washing solution through it.

In the embodiment of FIGURE 2 an inlet chamber 20 is connected with milker 17 and an outlet chamber 21 is connected with pipeline 18. A length of flexible hose 22 is connected between inlet and outlet chambers 20 and 21 and has inlet and outlet valves 23 and 24, respectively, associated therewith which define a central or measuring section 25 of the flexible hose. A point adjacent the center of section 25 of the hose is physically fixed as indicated at 26 dividing the measuring section of the hose into upper and lower portions 27 and 28. These portions are free to move or flex independently, and are arranged to actuate upper and lower control switches 29 and 30, respectively, which in turn control the action of valves 23 and 24.

Assuming that outlet valve 24 is closed and milk is flowing from the animal into inlet chamber 20, the milk flows by gravity on into hose 22 and fills the section above outlet valve 24. As the milk rises in the hose the additional weight thereof actuates switches 29 and 30 whereupon inlet valve 23 closes and outlet valve 24 opens, the milk draining from the hose by gravity into outlet chamber 21. Inlet valve 23 again opens and the operation repeats. A counter associated with the valves or switches 24 and 29 records the number of operations of the apparatus indicating the quantity of milk which flows through the system. Inlet chamber 20 holds a sufficient quantity of milk to provide a head or pressure of milk which flows into hose 22, and prevents a buildup of milk in hose 16 connected with the milker. Outlet chamber 21 provides for rapid draining of hose 22 and may be replaced in function by pipeline 18 if it has sufficient capacity to carry away the milk in hose 22. As the operation of valves 23 and 24 is based solely on the weight of milk flowing through hose 22 the device provides an accurate weight indication of the milk flow. Preferably the timing of the operation of the valves is such that outlet valve 24 remains open for a period after inlet valve 23 opens and until the milk almost reaches the outlet valve. This speeds the action of the system by venting any air from the hose as milk enters it.

Air bypass passageways 31 and 32 connect inlet and outlet chambers 20 and 21 and inlet chamber 20 with the central portion 25 of hose 22, respectively. These passageways equalize the vacuum conditions within the system eliminating any effect on the operation of milker 17 from the opening and closing of valves 23 and 24 and further aid in venting air trapped within the measuring portion of the hose upon closure of outlet valve 24. Inlet and outlet valves 23 and 24 are preferably electrically or solenoid operated clamping devices which are completely external of hose 22 and which close when the solenoid coil is energized. This reduces washing problems as the interior of the hose itself is smooth and may be washed easily with a circulating solution and facilitates replacement of the hose when necessary.

The control circuit for the batch weigher of FIGURE 2 is illustrated in FIGURE 3 and during the course of its description specific values will be indicated for certain of the circuit elements. It is to be understood that these values are given as examples of components of an operative circuit and that they are not critical but may be varied as will be apparent to those skilled in the art.

The circuit is energized by connecting terminals 35 and 36 with a suitable source of operating potential, as 110 volts A.C. Assuming that outlet valve 24 is closed (the circuit for accomplishing this will be discussed below) and that inlet valve 23 is open, milk flows into hose 22 from inlet chamber 20. As the weight of milk in hose 22 increases, lower switch 30 closes and then upper switch 29 closes, completing a circuit energizing relay 37 and actuating counter 38. Relay 37 has two sets of normally open and one set of normally closed contacts 37a, 37b and 37c, respectively, associated therewith. Contacts 37a provide a holding circuit for relay 37 shunting switch 29. Contacts 37b are connected in the circuit of solenoid 23a of inlet valve 23 and energize it closing the inlet valve when relay 37 is energized. Contact 37c opens breaking the circuit of thyratron 39 (through the connections marked X). This breaks the energization circuit for relay 40 opening contact 40a in the circuit of relay 41 which in turn deenergizes, opening contact 41a in the circuit of outlet valve solenoid 24a. The outlet valve opens and the milk flows from hose 22 into outlet chamber 21.

As the milk drains from the hose, upper switch 29 opens but has no effect on the circuit as it is shunted by contact 37a which is closed. As more milk drains from the hose lower switch 30 opens interrupting the circuit of relay 37 returning the contacts to the position shown in the drawing. Contact 37c closes completing the cathode circuit of thyratron 39, but as will appear, the tube does not fire for a short period, providing a time delay permitting milk coming through inlet valve 23 to flow into hose 22 and push any air therein out through the outlet valve 24. When the thyratron fires, relay 40 is energized closing contact 40a, energizing relay 41 which in turn closes contact 41a completing the energization circuit for outlet valve solenoid 24a and closing the outlet valve.

It will be noted that the control grid of thyratron 39 is returned through a network comprising capacitor 43, 0.1 μf., connected in parallel with fixed resistor 44, 1 megohm and variable resistor 45, 1 megohm, to the variable tap of resistor 46, 100,000 ohms, connected in series with resistor 47, 100,000 ohms, across terminals 35 and 36. During the portion of the cycle hose 22 is emptying contact 37c is open and thyratron 39 cannot conduct through its plate to cathode circuit. However, the cathode is connected through resistor 42, 20,000 ohms, with terminal 35, and when terminal 36 is positive with respect to terminal 35 the tube conducts from the cathode to the grid charging capacitor 43 as indicated. When hose 22 has emptied the circuit of relay 37 is broken returning the contact to the position shown in the drawing. Although the cathode circuit of thyratron 39 is completed to terminal 36 through contact 37c, the tube does not fire immediately because of the charge on capacitor 43. The magnitude of the charge on capacitor 43, the time constant of the circuit and the bias applied from potentiometer 46 are selected to keep thyratron 39 nonconductive for a sufficient period following the closing of contact 37c to permit milk flowing into hose 22 to reach a point just above outlet valve 24 before the thyratron fires. This aids in driving air from the hose and speeds operation of the measuring system.

A pair of probes 67, located in the upper portion of the chamber 62 are bridged by the milk when the chamber fills completing an electrical circuit which operates the valves. A second pair of probes 68 is located in outlet hose 65 and indicates the empty condition of the chamber. Other physical probe arrangements may be utilized to provide full and empty indications. Again, an air bypass or vacuum equalizer passageway 69 is connected between inlet and outlet chambers 60 and 61.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A measuring system for the milk flowing in an evacuated carry-away milking system from a source of milk to a carry-away milk line, comprising: a flexible hose having a valved inlet connected to said source of milk and a valved outlet connected to said carry-away line, the hose between said inlet and outlet forming a measuring section; means responsive to the weight of milk in said hose for actuating the valved inlet and outlet dividing milk flowing therethrough into equal portions; and means responsive to said dividing means for indicating the quantity of milk flowing through the system.

2. A measuring system for the milk flowing in an evacuated carry-away milking system from a source of milk to a carry-away milk line, comprising: a flexible hose having a valved inlet connected to said source of milk and a valve outlet connected to said carry-away line, the hose between said inlet and outlet forming a measuring section; switch means responsive to the weight of milk in the hose between the inlet and outlet valves for controlling the operation of the valves to divide the milk flowing therethrough into equal portions by weight; and means responsive to said dividing means for indicating the quantity of milk flowing through the system.

3. A measuring system for the milk flowing in an evacuated carry-away milking system from a source of milk to a carry-away milk line, comprising: a flexible hose having an inlet connected with said source of milk and an outlet connected with said carry-away line; an inlet valve associated with said hose; an outlet valve associated with said hose, the inlet and outlet valves defining an intermediate weighing section of hose; means fixing the position of an intermediate point of said hose section, dividing the hose into upper and lower portions; switch means associated with each portion of hose for controlling the operation of said valves to open and close alternately dividing milk flowing therethrough into equal portions; and means responsive to said dividing means for indicating the quantity of milk flowing through the system.

4. A measuring system for the milk flowing in an evacuated carry-away milking system from a source of milk to a carry-away milk line, comprising: a flexible hose having an inlet connected with said source of milk and an outlet connected with said carry-away line; an inlet valve associated with said hose; an outlet valve associated with said hose, the inlet and outlet valves defining an intermediate weighing section of hose; means fixing the position of an intermediate point of said hose section, dividing the hose into upper and lower portions; switch means associated with each portion of hose for controlling the operation of said valves to open and close alternately dividing milk flowing therethrough into equal portions; time delay means associated with the operation of said valves to delay closing of said outlet valve after the opening of the inlet valve after a period of time sufficient to permit evacuation of air from said weighing section of the hose; and means responsive to said dividing means for indicating the quantity of milk flowing through the system.

5. A measuring system of the character described in claim 4, wherein clamp type valves are provided at the inlet and outlet of said hose and external thereto.

6. A measuring system for the milk flowing in an evacuated carry-away milking system from a source of milk to a carry-away milk line, comprising: an inlet chamber connected with said source of milk; an outlet chamber connected with said milk line; a flexible hose having a valved inlet connected to said inlet chamber and a valved outlet connected to said outlet chamber; means responsive to the weight of milk in said hose for actuating the valved inlet and outlet dividing milk flowing therethrough into equal portions; and means responsive to said dividing means for indicating the quantity of milk flowing through the system.

7. A measuring system for the milk flowing in an evacuated carry-away milking system from a source of milk to a carry-away milk line, comprising: a flexible hose having a valved inlet connected to said source of milk and a valve outlet connected to said carry-away line, the hose between said inlet and outlet forming a measuring section; means responsive to the weight of milk in said hose for actuating the valved inlet and outlet dividing milk flowing therethrough into equal portions; means responsive to said dividing means for indicating the quantity of milk flowing through the system; and means for equalizing the pressure within said source, carry-away milk line and section of the flexible hose.

References Cited in the file of this patent
UNITED STATES PATENTS

| | | |
|---|---|---|
| 2,566,729 | Knaggs | Sept. 4, 1951 |
| 2,582,387 | Macneish | Jan. 15, 1952 |
| 2,588,461 | Atterting | Mar. 11, 1952 |
| 2,631,566 | Roop | Mar. 17, 1953 |
| 2,633,750 | Langstaff | Apr. 7, 1953 |
| 2,648,225 | Hemmens | Aug. 11, 1953 |
| 2,917,926 | Jaquith | Dec. 22, 1959 |